United States Patent
Fujii et al.

(10) Patent No.: US 7,684,476 B2
(45) Date of Patent: Mar. 23, 2010

(54) WIRELESS COMMUNICATION SYSTEM AND METHOD WITH FEEDBACK SIGNALS CONTAINING CHANNEL ESTIMATE VALUES

(75) Inventors: Hiromasa Fujii, Yokosuka (JP); Jiyun Shen, Yokohama (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1220 days.

(21) Appl. No.: 11/128,190

(22) Filed: May 13, 2005

(65) Prior Publication Data

US 2005/0254556 A1 Nov. 17, 2005

(30) Foreign Application Priority Data

May 13, 2004 (JP) .............................. 2004-144179

(51) Int. Cl.
*H04B 1/38* (2006.01)
(52) U.S. Cl. ...................... 375/221; 375/148; 455/92; 370/208
(58) Field of Classification Search ................ 375/144, 375/146, 148, 221, 257, 147, 227, 362; 455/92, 455/562.1; 370/208, 210, 334, 335, 42, 3
See application file for complete search history.

(56) References Cited

U.S. PATENT DOCUMENTS

| | | | | |
|---|---|---|---|---|
| 7,280,467 | B2* | 10/2007 | Smee et al. | 370/208 |
| 2002/0196842 | A1* | 12/2002 | Onggosanusi et al. | 375/148 |
| 2003/0003880 | A1* | 1/2003 | Ling et al. | 455/92 |
| 2004/0077378 | A1* | 4/2004 | Kim et al. | 455/562.1 |

FOREIGN PATENT DOCUMENTS

| | | |
|---|---|---|
| CN | 1386334 A | 12/2002 |
| CN | 1496143 A | 5/2004 |
| WO | WO 02/09317 A1 | 1/2002 |

OTHER PUBLICATIONS

Kazumi Miyashita, et al., Eigenbeam-Space Division Mulitplexing (E-SDM) in a MIMO Channel, Institute of Electronics, Information and Communication Engineers. Technical report of IEICE. (Shingakugiho, RCS 2002-53), (May 2002), pp. 13-18 (with Partial English Translation).

* cited by examiner

*Primary Examiner*—David C Payne
*Assistant Examiner*—Adolf Dsouza
(74) *Attorney, Agent, or Firm*—Oblon, Spivak, McClelland, Maier & Neustadt, L.L.P.

(57) ABSTRACT

A wireless communication system is disclosed that transmits a feedback signal containing a channel estimate value between a first wireless communication device and a second wireless communication device. The first wireless communication device that transmits the feedback signals includes: a channel estimation unit that receives signals containing pilot signals, and determines the channel estimate value of a wireless link; a multiplier that multiplies a pilot signal by the channel estimate value; and a multiplexer that multiplexes an output signal from the multiplier with another pilot signal, to generate the feedback signal. The second wireless communication device that receives the feedback signal includes: a separator that separates the signals that are multiplexed in the feedback signal; and channel estimation units that determine the channel estimate value of the wireless link, based on the separated signals.

8 Claims, 9 Drawing Sheets

FIG.6
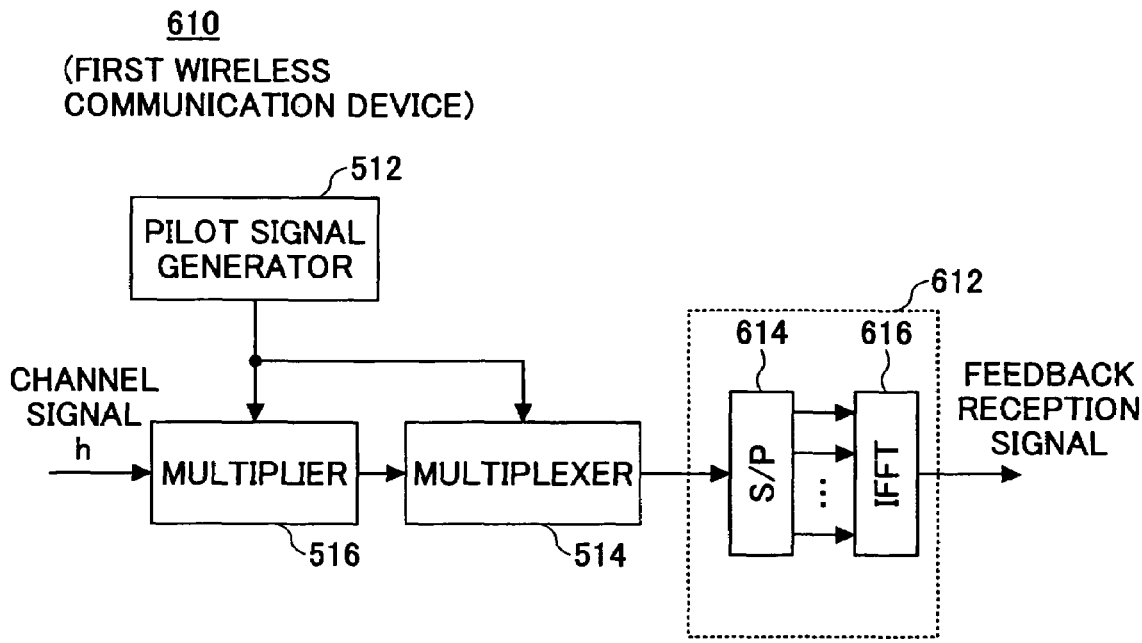
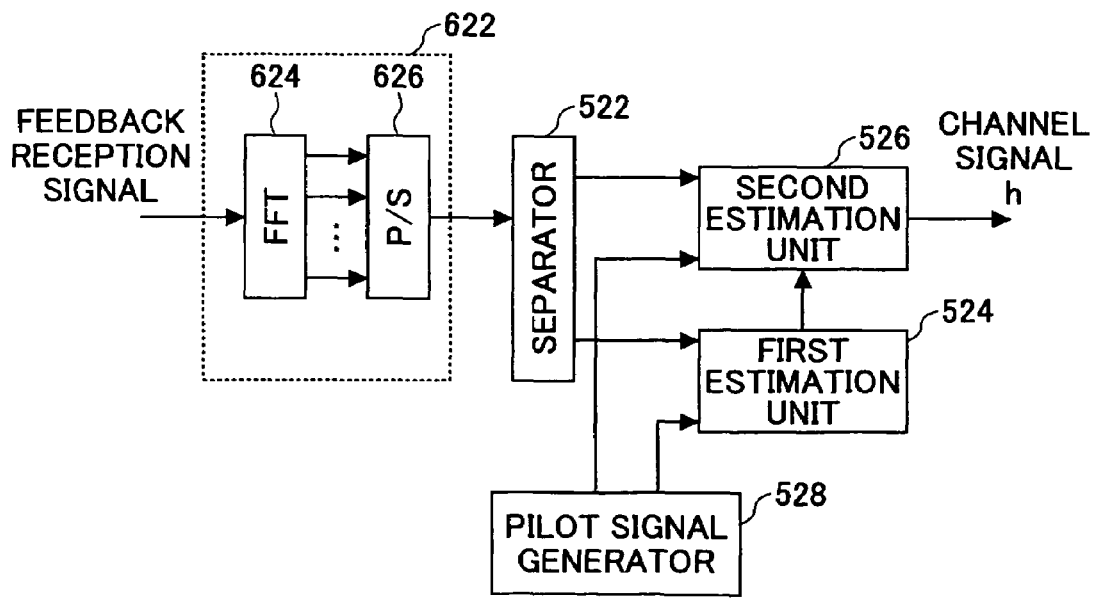

WIRELESS COMMUNICATION SYSTEM AND METHOD WITH FEEDBACK SIGNALS CONTAINING CHANNEL ESTIMATE VALUES

BACKGROUND OF THE INVENTION

The present invention generally relates to wireless communications, and, more particularly, to a wireless communication system in which feedback signals containing channel estimate values are transmitted, and a wireless communication device, a wireless reception device, a wireless communication method, and a channel estimation method that are used in the wireless communication system.

The multi-input multi-output (MIMO) method that has been drawing attention in this field of technology involves the technique of increasing the communication capacity using transmission paths or channels that are formed when multiple transmission antennas and reception antennas are prepared. One application of MIMO is the space division multiplexing (SDM) method by which independent signal streams are transmitted from the transmission antennas through the same frequency band at the same time, so that parallel transmission is realized. Those signals that are transmitted by the above method are combined and received by a receiver. Such a receiver can perform signal separation, using reception signals that are received by the reception antennas. Also, such a receiver can form beams by multiplying transmission weights (weighting factors) in the case where signal streams are transmitted from transmission antennas. Further, in a MIMO channel signal transmitting process, each transmission weight and each reception weight are suitably set so that beams orthogonal to one another can be formed between a transmitter and a receiver. With this fact being taken into account, there is also the eigen beam SDM (ESDM) method by which an independent transmission signal is not transmitted from each transmission antenna, but transmission signal streams are transmitted using the orthogonal beams. Compared with the SDM transmission, the ESDM method is more advantageous in that interference between streams can be reduced. By the ESDM method, a matrix W that is formed with the eigenvectors of a channel matrix is used as a transmission weight on the transmission side, and the conjugate transposition of the product of a channel matrix and an eigenmatrix $(HW)^H$ is used as a reception weight on the reception side. A signal stream transmitted from each antenna is then detected. Further, to increase the frequency efficiency, a system that combines the orthogonal frequency division multiplexing method and the ESDM method has also been suggested.

FIG. 1 is a block diagram illustrating a wireless communication device (described below as a transmitter, for ease of explanation) that combines the ESDM method and the OFDM method. The transmitter 100 includes a first serial-to-parallel converter 102, second serial-to-parallel converters 104, the same number of ESDM signal generators 106 as the sub carriers to be used in accordance with the OFDM method, OFDM modulators 108 (including an inverse fast Fourier transformer, a parallel-to-serial converter, and a guard interval inserter) that correspond to transmission antennas, first pilot inserters 110 that correspond to the transmission antennas, and the transmission antennas 112. The transmitter 100 further includes a feedback signal receiver 114, a separator 116, and transmission weight generators 118 that correspond to the respective sub carriers. In general, the relationship among the number $N_{st}$ of streams to be input to the ESDM signal generators 106, the number N of transmission antennas, and the number M of reception antennas is expressed as $1 \leq N_{st} \leq \min(N,M)$, where min (N,M) indicates the operation of selecting the smaller one of N and M. For ease of explanation, $N_{st}$ is equal to N in the following description.

FIG. 2 is a block diagram illustrating a wireless communication device (described below as a receiver, for ease of explanation) that employs both the ESDM method and the OFDM method. The receiver 200 includes reception antennas 202, OFDM demodulators 204 (including a guard interval remover, a serial-to-parallel converter, and a fast Fourier transformer) that are provided for the respective reception antennas, the same number of ESDM signal separators 206 as the sub carriers, the same number of third parallel-to-serial converters 208 as the streams (N), and a fourth parallel-to-serial converter 210. The receiver 200 further includes the same number of pilot channel estimation units 212 as the reception antennas 202, a separator 214, the same number of reception weight generators 216 as the sub carriers, and a feedback unit 218.

As shown in FIG. 1, a data signal (a data symbol) to be transmitted is converted into groups of signals (signal sequences or streams) by the first serial-to-parallel converter 102. Each of the streams after the conversion is further converted into the same number of signals as the sub carriers by the second serial-to-parallel converters 104. The groups of signals after the conversion are provided with transmission weights or weighting factors for each sub carrier component by the ESDM signal generators 106 of the same number as the sub carriers. With the weighting factors, signals that are transmitted from the respective transmission antennas 112 can be distinguished from one another. The weighting factors are determined based on the eigenvalues and the eigenvectors of the corresponding channel matrix. The weighted signal groups are then modulated through inverse fast Fourier transform performed by the same number of OFDM modulators 108 as the transmission antennas 112. The first pilot inserters 110 give pilot signals to the outputs from the corresponding OFDM modulators 108. After guard intervals are inserted, those outputs are transmitted from the transmission antennas 112.

The signals received by the reception antennas 202 shown in FIG. 2 are subjected to fast Fourier transform in the OFDM demodulators 204, and are divided into signals on each sub carrier. The signal on each sub carrier after the OFDM demodulation are further divided into the same number of signal groups as the transmission antennas 112 by the ESDM signal separators 206 using reception weights (weighting factors). The divided signal groups are then converted into the same number of signal streams as the transmission antennas 112 by the third parallel-to-serial converters 208, and are further converted into a single data symbol by the fourth parallel-to-serial converter 210.

Meanwhile, based on the signal groups received by the reception antennas 202, the pilot channel estimation unit 212 estimates the channel impulse response (CIR) values between the transmission antennas 112 and the reception antennas 202. This estimation is carried out by observing how pilot signals vary in the transmission path between the transmission end and the reception end. In this example, the channel impulse values of the cth sub carrier component between the mth reception antenna and the nth transmission antenna is expressed as $h_{cmn}$. In the following description, symbols with the subscript "c" is an index of sub carrier. The matrix $H_c$ that has the respective channel impulse response values $h_{cmn}$ as matrix elements is referred to as a channel matrix, and is expressed as follows:

$$H_c = \begin{bmatrix} h_{c11} & h_{c12} & \cdots & h_{c1N} \\ h_{c21} & h_{c22} & \cdots & h_{c2N} \\ \vdots & \vdots & \ddots & \vdots \\ h_{cM1} & h_{cM2} & \cdots & h_{cMN} \end{bmatrix} \quad \text{(Equation 1)}$$

where N indicates the number of transmission antennas 112, and M indicates the number of reception antennas 202. The information as to the channel impulse response values is input to the reception weight generators 216 that are prepared for the respective sub carriers. Each of the reception weight generators 216 determines the eigenvalue $\lambda_{cn}$ and the eigenvector $w_{cn}$ ($1 \leq n \leq N$) of the matrix represented by $H_c^H H_c$, and supplies the amount representing ($H_c w_{cn}$) to the corresponding ESDM signal separator 206. Here, the operator represented by the superscript "H" is the conjugate transpose. The eigenvector $w_{cn}$ is the vector that has the same number of components as the transmission antennas 112.

Meanwhile, the cth sub carrier component $r_c$ contained in reception signals is expressed as:

$$r_c = r_{c1} + \ldots + r_{cN}$$

where $r_{cn}$ can be expressed as:

$$r_{cn} = H_c w_{cn} s_{cn}$$

Alternatively, $r_{cn}$ may be expressed as:

$$r_{cn} = (r_{c1n} \ldots r_{cMn})^T$$

where T indicates the transpose. Also, $s_{cn}$ indicates the signal component transmitted on the cth sub carrier among the transmitted signals. Accordingly, at each of the ESDM signal separators 206, the transmitted signal can be determined by multiplying the reception signal $r_{cn} = H_c w_{cn} s_{cn}$ by $(H_c w_{cn})^H$. This is because the relationship between the eigenvalue $\lambda_{cn}$ and the eigenvector $w_{cn}$ can be expressed as:

$$(H_c w_{cn})^H (H_c w_{cn}) = \lambda_{cn}$$

$$(H_c w_{cn})^H (H_c w_{cn}) = 0 \, (n \neq j)$$

Meanwhile, the channel impulse response values or the information as to the channel matrix estimated by the pilot channel estimation units 212 are fed back to the transmitter 100 through the feedback unit 218.

The transmitter 100 shown in FIG. 1 receives the information, which is fed back from the receiver 200, through the feedback signal receiver 114, and divides the information into sets of information corresponding to the sub carriers at the separator 116. The divided information is the information as to the channel value of each sub carrier, and is supplied to the transmission weight generators 118 corresponding to the sub carriers. The transmission weight generators 118 calculate the weighting factors $w_{cn}$ of the respective sub carriers. The transmitter 100 uses the weighting factors for the next transmission, instead of the previously used weighting factors.

An example of the ESDM wireless communication technique is disclosed in Miyashita, et al., Shingakugiho, RCS 2002-53.

The feedback signals are transmitted from the receiver 200 to the transmitter 100, because the channel estimate value h of the forward link that is directed from the transmitter 100 to the receiver 200 is normally different from the channel estimate value h' of the backward link that is directed from the receiver 200 to the transmitter 100. In short, the frequency division duplexing (FDD) method is supposed to be employed here. However, it is not necessary to transmit feedback signals in accordance with the time division duplexing (TDD) method in which the channel estimate values are equal to each other of the forward link and the backward link.

FIG. 3 is a block diagram showing the feedback unit 218 of the receiver 200 of FIG. 2. As shown in FIG. 3, the channel information representing the channel estimate value h is quantized to a quantization level suitable for feedback signals by a feedback quantizing unit. To reduce the information amount of the feedback signals, the small number of quantization levels should be used. The quantized binary signals are then subjected to error correction encoding by an encoder, and are output to an interleaver. The signals rearranged by the interleaver are mapped to suitable symbols by a symbol mapping unit. The mapped signals are then multiplexed with pilot signals. The multiplexed signals are then converted into parallel signals by the serial-to-parallel converter (S/P) in an OFDM modulator indicated by a broken-line frame in FIG. 3. The converted signals are further subjected to inverse fast Fourier transform in the OFDM modulator. In this manner, feedback signals containing channel information are generated and transmitted to the transmitter 100. In the case of employing a single-carrier method, instead of the OFDM method, the serial-to-parallel converter (S/P) and the IFFT unit indicated in the broken-line frame are omitted.

FIG. 4 is a block diagram showing the feedback signal receiver 114 of the transmitter 100 of FIG. 1. As shown in FIG. 4, the received feedback signals are subjected to fast Fourier transform in an OFDM demodulator indicated by a broken-line frame. The feedback signals are thus converted into signal groups of the frequency regions, and are further converted into series signals by a parallel-to-serial converter (P/S). Based on those signals, channel estimation and channel compensation are carried out. Based on the signals after the channel compensation, symbol decision is carried out at a demapping unit. The signals after the decision are rearranged in a predetermined order by a deinterleaver. The rearranged signals are subjected to error correction decoding by a decoder. The channel estimate value h, which is reproduced based on the bit stream as the result of the decoding is output from a channel reproducing unit. In the case of employing a single-carrier method, instead of the OFDM method, the FFT unit and the parallel-to-serial converter (P/S) indicated in the broken-line frame in FIG. 4 are omitted.

As described above, a large number of signals and a large amount of signal processing are required for transmission and reception of feedback signals. By the ESDM transmission technique of the FDD method, it is necessary to feed all the channel information back to the transmitter from the receiver. Accordingly, the amount of feedback becomes very large. As a result, the resources for transmitting signals such as data signals other than feedback signals might be insufficient. This problem becomes more severe when wireless communication is performed in wide bands, as even more feedback signals are transmitted.

SUMMARY OF THE INVENTION

A general object of the present invention is to provide wireless communication systems in which the above disadvantages are eliminated.

A more specific object of the present invention is to provide a wireless communication system, a wireless communication device, a wireless reception device, a wireless communication method, and a channel estimation method that enable to reduce the amount of feedback signal including channel estimate values.

The above objects of the present invention are achieved by a wireless communication system that transmits a feedback signal containing at least a channel estimate value between a first wireless communication device and a second wireless communication device. In this wireless communication system, the first wireless communication device that transmits the feedback signal includes: a channel estimation unit that receives a signal containing pilot signals, and determines a channel estimate value of a wireless link; a multiplier that multiplies one of the pilot signals by the channel estimate value; and a multiplexer that multiplexes an output signal from the multiplier with the other pilot signals, to generate the feedback signal. The second wireless communication device that receives the feedback signal includes: a separator that separates the signals that are multiplexed in the feedback signal; and a channel estimation unit that determines the channel estimate value of the wireless link, based on the separated signals.

In accordance with the present invention, the amount of feedback signal transmission containing channel estimate values can be reduced.

The above and other objects and features of the present invention will become more apparent from the following description taken in conjunction with the accompanying drawings.

BRIEF DESCRIPTION OF THE DRAWINGS

FIG. 6 is a schematic view of a wireless communication system in accordance with a second embodiment of the present invention;

DESCRIPTION OF THE PREFERRED EMBODIMENTS

Figure 1:
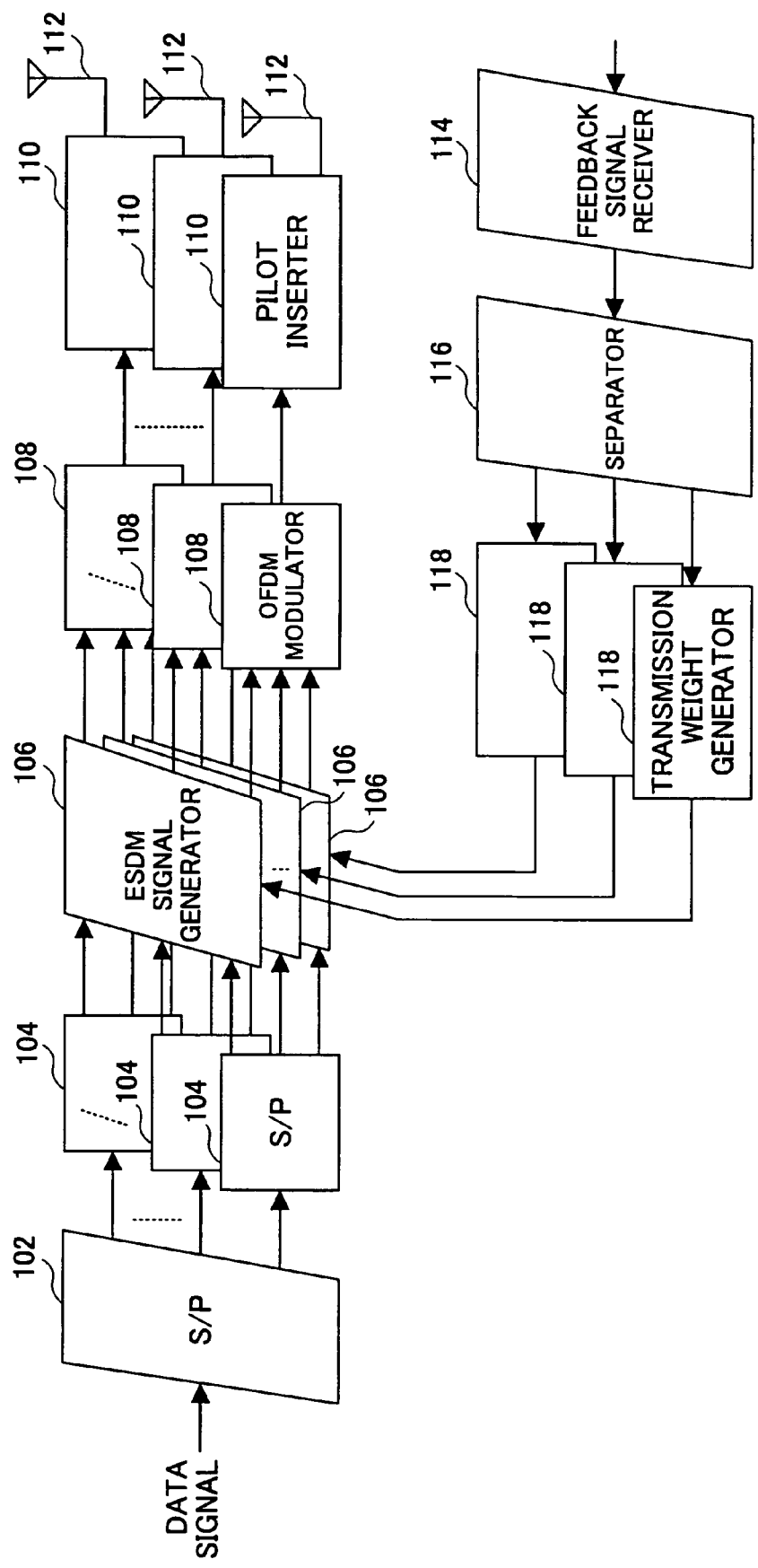
FIG. 1 is a block diagram of a conventional ESDM transmitter.
Figure 2:
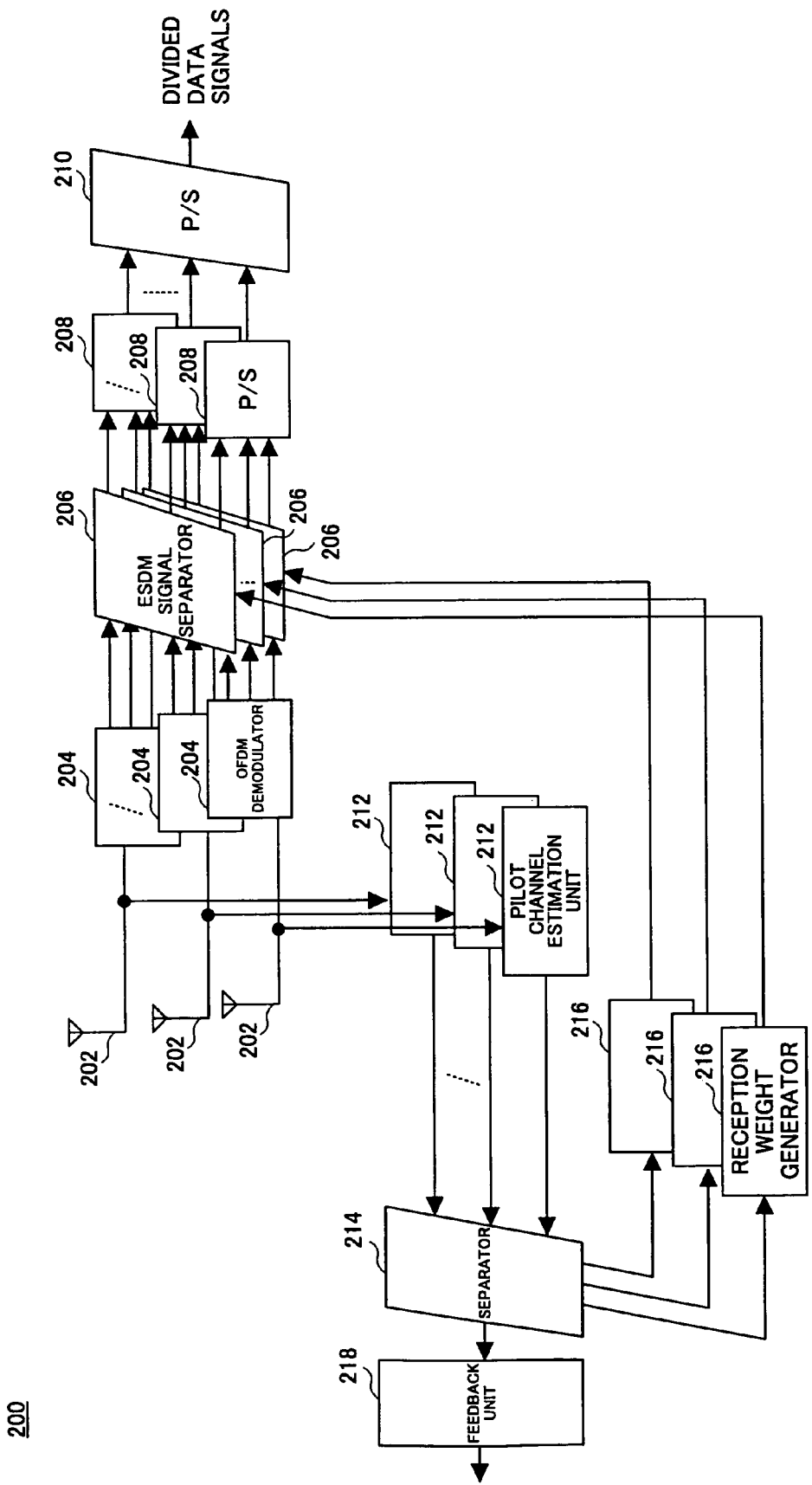
FIG. 2 is a block diagram of a conventional ESDM receiver.

In accordance with an embodiment of the present invention, a pilot signal that is weighted with channel information is multiplexed with a pilot signal that is not weighted with channel information, so as to form a feedback signal. Using this feedback signal, desired channel information can be readily obtained in a wireless communication system that receives the feedback signal.

In accordance with another embodiment of the present invention, a code spreading unit that code-spreads the channel information signals prior to the multiplication by a pilot signal is provided in an OFDM wireless communication device. With this unit, the robustness against frequency selective fading can be increased where the channel estimate value relating to each sub carrier is wirelessly transmitted.

In accordance with yet another embodiment of the present invention, an interleaver that rearranges signals representing the channel estimate value obtained prior to the multiplication by a pilot signal in a predetermined order is provided in an OFDM wireless communication device. With the interleaver, signals that represent the same channel estimate values are not mapped to neighboring sub carriers.

In still another embodiment of the present invention, a channel estimation unit is provided that determines the channel estimate value of the backward link based on one of the separated signals, and then determines the channel estimate value of the forward link based on the other one of the separated signals; then the channel estimate value is provided in a wireless reception device that receives a feedback signal in which a signal formed by multiplying the channel estimate value by a pilot signal is multiplexed with another pilot signal. With this structure, channel information can be more readily obtained.

In yet another embodiment of the present invention, an MMSE filter that determines the channel estimate value of the forward link based on the channel estimate value of the backward link is provided in a wireless reception device. With this structure, channel information can be estimated accurately.

In still another embodiment of the present invention, a normalizing unit that normalizes the average power of signals representing the channel estimate value of the forward link prior to the input to the multiplier is further provided in a wireless communication device. With this structure, the amplitude of the signal representing the channel estimate value can be maintained within a desired range, and non-linear distortion and noise can be avoided.

In yet another embodiment of the present invention, a duplication unit that makes duplications of the signal representing the channel estimate value of the forward link prior to the input to the multiplier is further provided in a wireless communication device. In this structure, signals having identical contents are transmitted separately from one another as feedback signals. Accordingly, the reception energy per channel information item representing a channel estimate value can be increased, and the signal quality can be improved. In still another embodiment of the present invention, an averaging unit that averages signals that represent the same channel value is provided in a wireless communication device. Through the averaging process, the signal quality can be increased.

In yet another embodiment of the present invention, the signal representing the amount of the absolute level of each received signal or the signal representing the amount of reference power is transmitted together with or separately from a feedback signal. In this structure, a communication device that receives the feedback signal or the like can measure not only the relative power of each channel estimate value but also the absolute power of each channel estimate value. Thus, the signal quality such as a SNR can be measured.

The following is a description of embodiments of the present invention, with reference to the accompanying drawings. In the drawings, like components are denoted by like reference numerals.

First Embodiment

Figure 5:
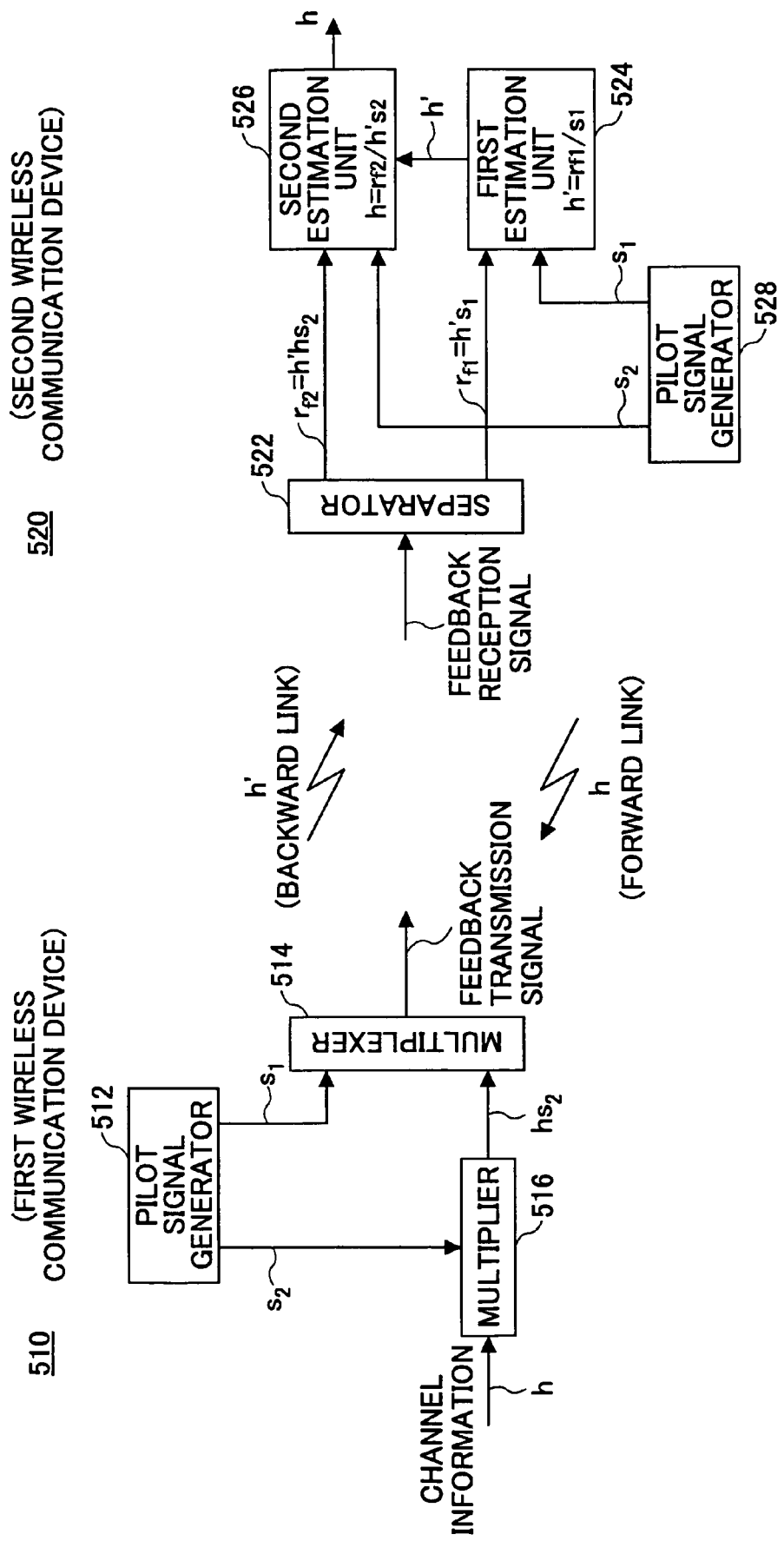
FIG. 5 is a schematic view of a wireless communication system in accordance with a first embodiment of the present invention.

FIG. 5 is a schematic view of an FDD wireless communication system in accordance with an embodiment of the present invention. The drawing shows a first wireless communication device 510 that transmits feedback signals, and a second wireless communication device 520 that receives the feedback signals. The first and second wireless communication devices 510 and 520 are ESDM devices in this embodiment, but they may be devices of other types that transmit and receive channel information in the form of feedback signals. The first wireless communication device 510 includes a pilot signal generator 512, a multiplexer 514, and a multiplier 516. The second wireless communication device 520 includes a separator 522, a first estimation unit 524, a second estimation unit 526, and a pilot signal generator 528. For ease of explanation, the wireless link directed from the second wireless communication device 520 to the first wireless communication device 510 is referred to as the forward link, and the wireless link directed in the opposite direction is referred to as the backward link. The channel information (channel estimate values or channel impulse response values) of the forward link is denoted by h, and the channel information of the backward link is denoted by h'. In this description, "channel information" is used synonymously for "channel estimate values".

The pilot signal generator 512 of the first wireless communication device 510 generates pilot signals that are known both to the transmission end and the reception end. The pilot signals may be referred to as known signals, reference signals, or training signals. The pilot signal generator 512 outputs two pilot signals $s_1$ and $s_2$. These pilot signals $s_1$ and $s_2$ may be different signal contents or the same signal contents, as long as they are known both to the transmission end and the reception end. To reduce the signal processing workload, the two pilot signals should preferably have the same contents. In the following description, these two pilot signals are distinguished as the first pilot signal $s_1$ and the second pilot signal $s_2$. The first pilot signal $s_1$ is supplied to one of the inputs of the multiplexer 514.

The multiplier 516 multiplies the signal representing the channel information h by the second pilot signal $s_2$, so as to output a multiplication result $hs_2$. The multiplication result $hs_2$ is then supplied to the other input of the multiplexer 514.

The multiplexer multiplexes the two input signals $s_1$ and $hs_2$, so as to generate a feedback signal. For example, the multiplexer 514 allocates those two signals into two neighboring or separate time slots, thereby performing multiplexing.

The separator 522 of the second wireless communication device 520 separates the signals multiplexed in the received feedback signal. One signal $r_{f1}$ of the separated signals is supplied to one of the inputs of the first estimation unit 524, and the other signal $r_{f2}$ of the separated signals is supplied to one of the inputs of the second estimation unit 526.

The pilot signal generator 528 supplies the first pilot signal $s_1$ to the other input of the first estimation unit 524. The pilot signal generator 528 also supplies the second pilot signal $s_2$ to the other input of the second estimation unit 526.

Based on the signal $r_{f1}$ separated by the separator 522 and the first pilot signal $s_1$, the first estimation unit 524 calculates and outputs the channel estimate value h' of the backward link.

Based on the other signal $r_{f2}$ separated by the separator 522 and the second pilot signal $s_2$ and h', the second estimation unit 526 calculates and outputs the channel estimate value h of the forward link.

Next, the operation of the wireless communication system is described. In this description, the first and second wireless communication devices 510 and 520 both perform wireless communications. The second wireless communication device 520 transmits pilot signals to the first wireless communication device 510. Based on pilot signals received from the second wireless communication device 520, the channel information h to be transmitted can be estimated by a channel estimation unit (not shown).

The multiplier 516 multiplies the channel information h by the second pilot signal $s_2$, and supplies the multiplication result $hs_2$ to the other input of the multiplexer 514. The multiplexer 514 multiplexes the first pilot signal $s_1$ supplied through one of the inputs with the multiplication result $hs_2$ supplied through the other one of the inputs, thereby generating a feedback signal. The feedback signal is transmitted to the second wireless communication device 520 through the backward wireless link.

The reception signal (the feedback signal) that is received by the second wireless communication device 520 and that is input to the separator 522 contains the above multiplexed two signals. More specifically, the reception signal contains the first reception signal $r_{f1}$ relating to the first pilot signal and the second reception signal $r_{f2}$ relating to the second pilot signal. These reception signals are separated by the separator 522. Since the reception signals are affected by the backward link channel value h', they can be expressed as:

$$r_{f1} = h' s_1 \qquad (A)$$

$$r_{f2} = h' h s_2 \qquad (B)$$

The first estimation unit 524 divides the first reception signal $r_{f1} = h' s_1$ by the first pilot signal $s_1$, so as to obtain the channel estimate value h' of the backward link. If the first pilot signal $s_1$ contains plural pilot symbols, the first estimation unit 524 determines a channel estimate value for each symbol, and obtains the average value of the determined channel estimate values. The second estimation unit 526 divides the second reception signal $r_{f2} = h' h s_2$ by the channel estimate value h' of the backward link and the second pilot signal $s_2$, so as to obtain the channel estimate value h of the forward link.

As described above, a feedback signal in which the pilot signal $hs_2$ weighted with the channel information h is multiplexed with the pilot signal $s_1$ not weighted with channel information is used to readily obtain the channel information of the forward link in a wireless communication device that receives feedback signals.

In the example illustrated in FIG. 5, the first estimation unit 524 and the second estimation unit 526 are shown as separate function blocks, for ease of explanation. However, the present invention is not limited to that structure, and the channel information h of the forward link may be obtained from $(r_{f2} \cdot s_1)/(r_{f1} \cdot s_2)$, $(r_{f2}/r_{f1}) \cdot (s_1/s_2)$, or the like. Based on the equations (A) and (B), an arbitrary technique can be used to determine the channel information h of the forward link. If the contents of the first and second pilot signals are the same ($s_1 = s_2$), the channel information h of the forward link can be readily determined by calculating $r_{f2}/r_{f1}$.

Figure 3:
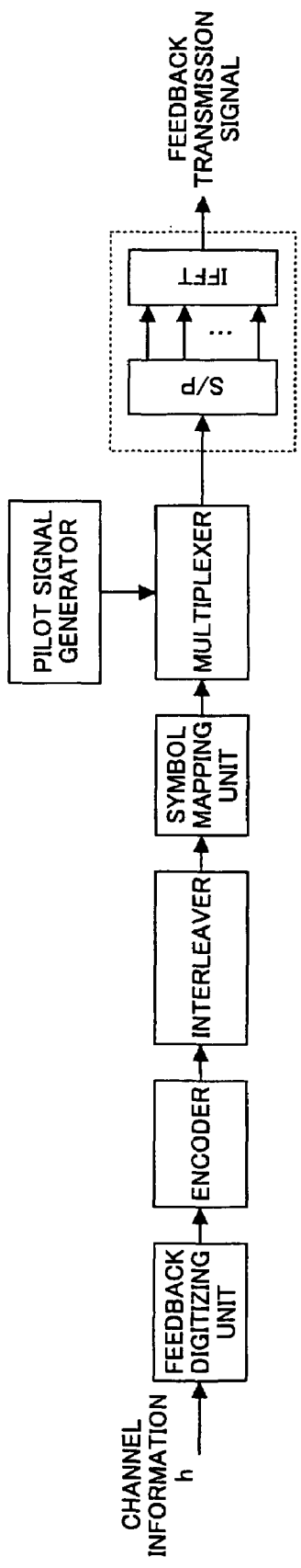
FIG. 3 is a block diagram of the feedback unit of the receiver.
Figure 4:
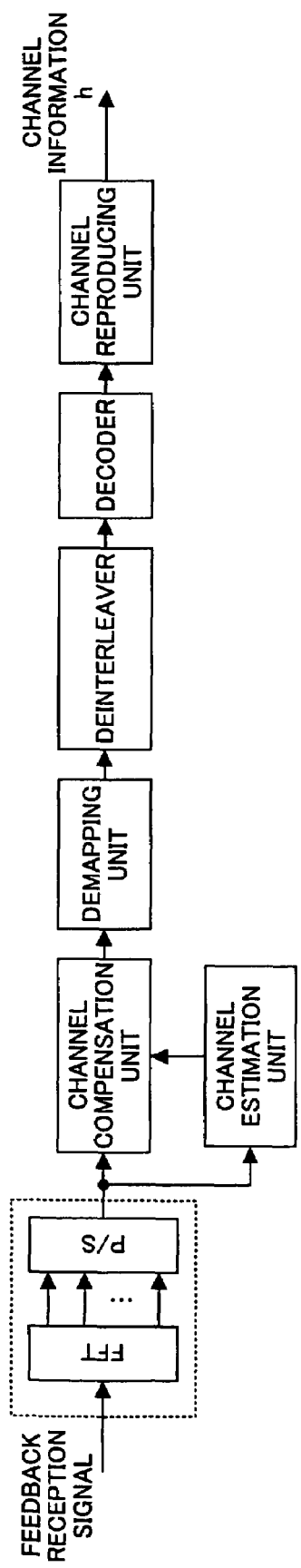
FIG. 4 is a block diagram of the feedback signal receiver of the transmitter.

In accordance with a conventional method, to determine the channel information h of the forward link, channel information that has been subjected to quantizing for feedback, encoding, symbol mapping, or the like, is transmitted (FIG. 3), and an operation in the opposite order is performed on the reception end (FIG. 4). In this embodiment, on the other hand, a pilot signal weighted with the channel information h of the forward link and a non-weighted pilot signal are transmitted, and channel information is determined based on the pilot signals on the reception end. Accordingly, the number of feedback signals and the amount of signal processing are dramatically reduced. Unlike the conventional technique requiring complicated digital signal processing, channel information can be readily determined by simple signal processing. More specifically, in a case where the number of transmission antennas and the number of reception antennas are both 4 and the number of FFT points is 64, the number of symbols that are transmitted and received as feedback signals or the number of symbols becomes 64×4×4=1024. If it is assumed that the number of quantization levels is $2^5$=32 (10 bits as the total of I components and Q components), the encoding rate is ¾, and the modulation method is 64 QAM (6 bits per symbol), the number of signals that are received as feedback signals becomes 64×4×4×(10/6)÷(¾)≈2275. Accordingly, in this embodiment, the number of feedback signals can be reduced by more than half. However, the above numerical values are merely examples. In this embodiment, the operational workload in transmission and reception of feedback signals is reduced. Accordingly, feedback signals can be swiftly transmitted, and the delay time of feedback signals can be made shorter than in a conventional case.

Second Embodiment

FIG. 6 illustrates first and second wireless communication devices 610 and 620 that are used in a wireless communication system in accordance with a second embodiment of the present invention. Like the system illustrated in FIG. 5, the first wireless communication device 610 transmits a feedback signal containing the channel information h of the forward link, and the second wireless communication device 620 receives the feedback signal. In the first wireless communication device 610 of this embodiment, an OFDM modulator 612 that is connected to the multiplexer 514 is provided. The OFDM modulator 612 includes a serial-to-parallel converter (S/P) 614 and an inverse fast Fourier converter 616. In the second wireless communication device 620, an OFDM demodulator 622 that is connected to the separator 522 is provided. The OFDM demodulator 622 includes a fast Fourier converter 624 and a parallel-to-serial converter (P/S) 626.

In this embodiment, OFDM modulation and demodulation are performed. Each feedback signal transmitted from the first wireless communication device 610 is modulated by the OFDM modulator 612, and is transmitted. In the second wireless communication device 620, each reception signal is demodulated by the OFDM demodulator 622, and the channel information h of the forward link is calculated in the same manner as in the system illustrated in FIG. 5.

Third Embodiment

In the first and second embodiments, the channel information h is input directly to the multiplier 516. However, to operate in the linear power range of an amplifier and to restrict adverse influence of noise, the amplitude $a_x$ of each signal representing the channel information should preferably be normalized. The normalizing coefficient c by which the signal representing the channel information is multiplied can be determined by various techniques. For example, to limit the maximum value, the normalization coefficient c may be expressed as:

$$c = (\max(a_x)/A_{MAX})^{-1}$$

where $\max(a_x)$ represents the maximum value of the amplitude $a_x$, and $A_{MAX}$ represents the predetermined upper limit value. Also, to stabilize the average value, the normalization coefficient c may be expressed as:

$$c = ((\Sigma a_x)/N_x)^{-1}A_v$$

where $N_x$ represents the number of samples to be averaged, and $A_v$ represents the predetermined constant.

Fourth Embodiment

Figure 7:
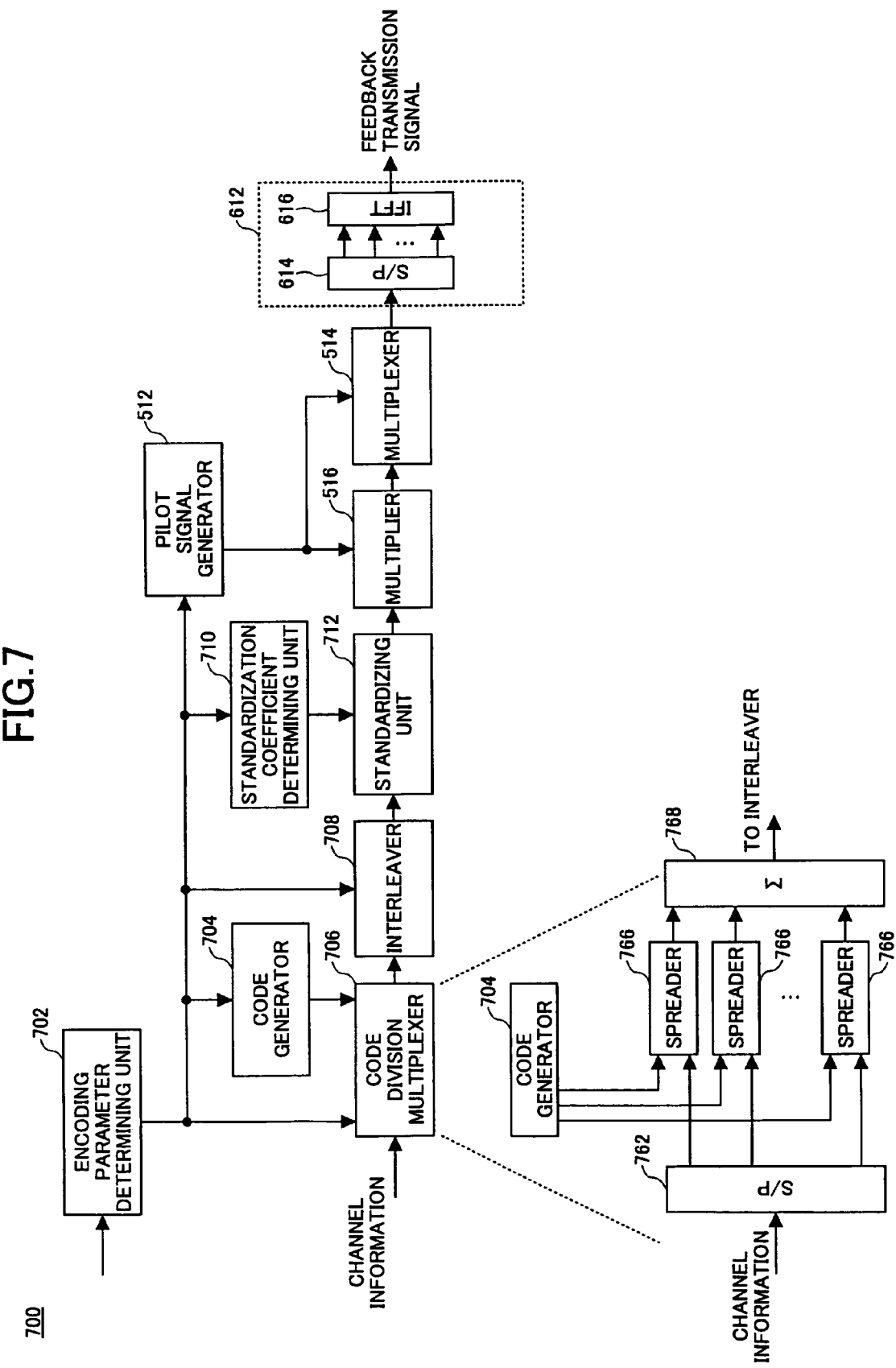
FIG. 7 is a block diagram of a wireless communication device in accordance with a fourth embodiment of the present invention.

FIG. 7 is a block diagram illustrating a wireless communication device 700 that transmits feedback signals in accordance with a fourth embodiment of the present invention. In this embodiment, code spread channel information is multiplied by a pilot signal, and is then multiplexed with the same or another pilot signal. After being subjected to OFDM modulation, the channel information is transmitted. In addition to the pilot signal generator 512, the multiplier 516, the multiplexer 514, and the OFDM modulator 612 that are described in First Embodiment and Second Embodiment, the wireless communication device 700 includes a spreading parameter determining unit 702, a code generator 704, a code division multiplexer 706, an interleaver 708, a normalization coefficient determining unit 710, and a normalizing unit 712. The code division multiplexer 706 includes a serial-to-parallel converter (S/P) 762, spreaders 766, and a combiner (Σ) 768.

The spreading parameter determining unit 702 determines parameters such as the code length and the number of codes to be used. The code length is equivalent to the length of each code to be multiplied at the spreaders 766. The multiplexing number is equivalent to the number of spreaders 766. The code generator 704 uses the parameters determined by the spreading parameter determining unit 704, to generate the codes to be used. The serial-to-parallel converter 762 in the code division multiplexer 706 parallelizes input signals (channel information) according to the number that is designated as the multiplexing number. Each of the spreaders 766 multiplies one of the parallelized signals (one signal stream) by a code. The combiner 768 combines the coded signals into one signal. By changing the code length and the multiplexing number, the transmission energy per channel information item and the accuracy of feedback signals can be adjusted. Also, the normalization coefficient c may be determined in accordance with the code length or the multiplexing number. Further, based on a signal quality parameter such as a signal-to-noise power ratio (SNR), the spreading parameters may be changed when necessary. Such signal quality parameters of the forward link and the backward link may be the same or different.

The interleaver 708 changes the order of signals in accordance with predetermined rules. By doing so, the symbols that represent the same channel information are prevented from being mapped to neighboring sub carriers, and the degradation of accuracy of fed back information by frequency selective fading can be avoided.

The normalizing coefficient determining unit 710 determines the normalization coefficient c that is described in Third Embodiment. The normalizing unit 712 multiplies the determined normalization coefficient c by an input signal, and supplies the result to the multiplier 516.

Figure 8:
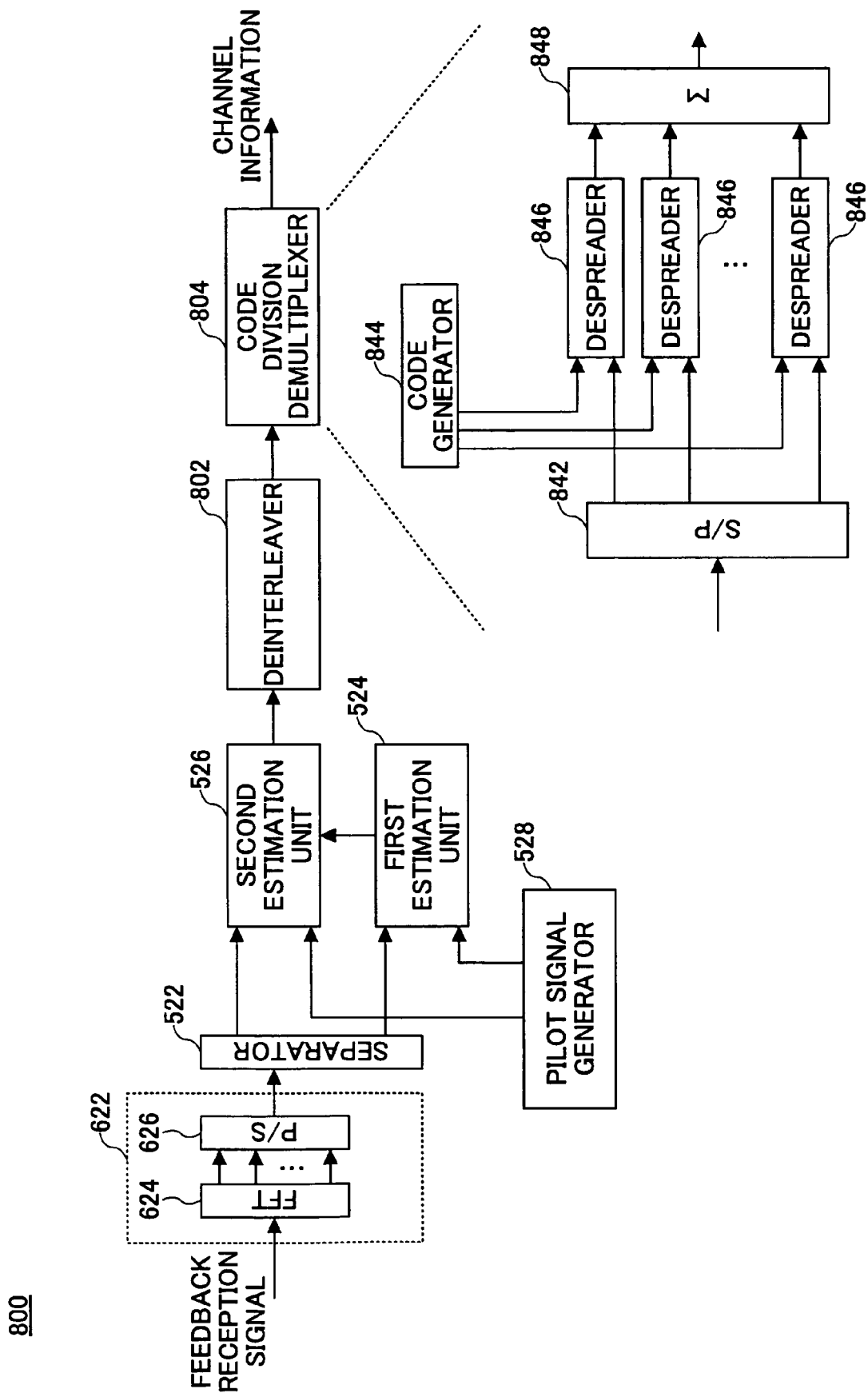
FIG. 8 is a block diagram of another wireless communication device in accordance with the fourth embodiment of the present invention.

FIG. 8 is a block diagram illustrating a wireless communication device 800 that receives feedback signals in accordance with the fourth embodiment of the present invention. In this embodiment, each received feedback signal is demodulated by the OFDM method, channel estimation is carried out, deinterleaving is performed, despreading is carried out, and channel information is obtained. In addition to the OFDM demodulator 622, the separator 522, the first and second estimation units 524 and 526, and the pilot signal generator 528 that are described in the First Embodiment and Second Embodiment, the wireless communication device 800 includes a deinterleaver 802 and a despreading unit 804. The despreading unit 804 includes a serial-to-parallel converter (S/P) 842, a code generator 844, despreaders 846, and a combiner (Σ) 848. The OFDM demodulation and channel estimation are described above, and therefore, further explanation of them is omitted herein.

The deinterleaver 802 changes the order of signals in accordance with predetermined rules. The predetermined rules correspond to the rules used at the interleaver 708 shown in FIG. 7.

The code generator 844 of the despreading unit 804 generates the same codes as those generated by the code generator 704 of FIG. 7. The serial-to-parallel converter (S/P) 842 converts each input signal into parallel signals. Each of the despreaders 846 multiplies one of the parallelized signals by a code, and then performs despreading to output the channel information h through the combiner 848.

In a communication system that utilizes a multicarrier method such as the OFDM method, the state of the channel varies from that of a different sub carrier. Therefore, it is necessary to determine a channel estimate value for each sub carrier, and transmit the channel estimate value through a feedback signal. During the wireless transmission of the feedback signal, the feedback signal is often affected by frequency selective fading. Therefore, the information as to a sub carrier might be greatly affected by noise. In such a case, an accurate channel estimate value cannot be determined on the reception end. In a wireless communication system in accordance with this embodiment, spreading, interleaving, and other necessary operations are performed to cope with the problems due to the frequency selective fading. First, channel information is spread over a wide frequency range by the code division multiplexer 706 and the interleaver 708 shown in FIG. 7. By doing so, the resistance to frequency fading can be made higher than before. The spread signals may be input to the normalizing unit 712 or the multiplier 516.

In this embodiment, interleaving is performed by the interleaver 708, so that similar signals are prevented from being mapped to neighboring sub carriers. The interleaved signals are appropriately normalized by the normalizing unit 712, and are then input to the multiplier 516. Feedback signals are then formed by the above described technique. On the reception end, each received feedback signal is demodulated by the OFDM, and channel estimation is carried out. After the estimation, the signals are input to the deinterleaver 802 shown in FIG. 8, and are despread by the despreading unit 804. Thus, the channel information h is obtained.

Fifth Embodiment

Figure 9:
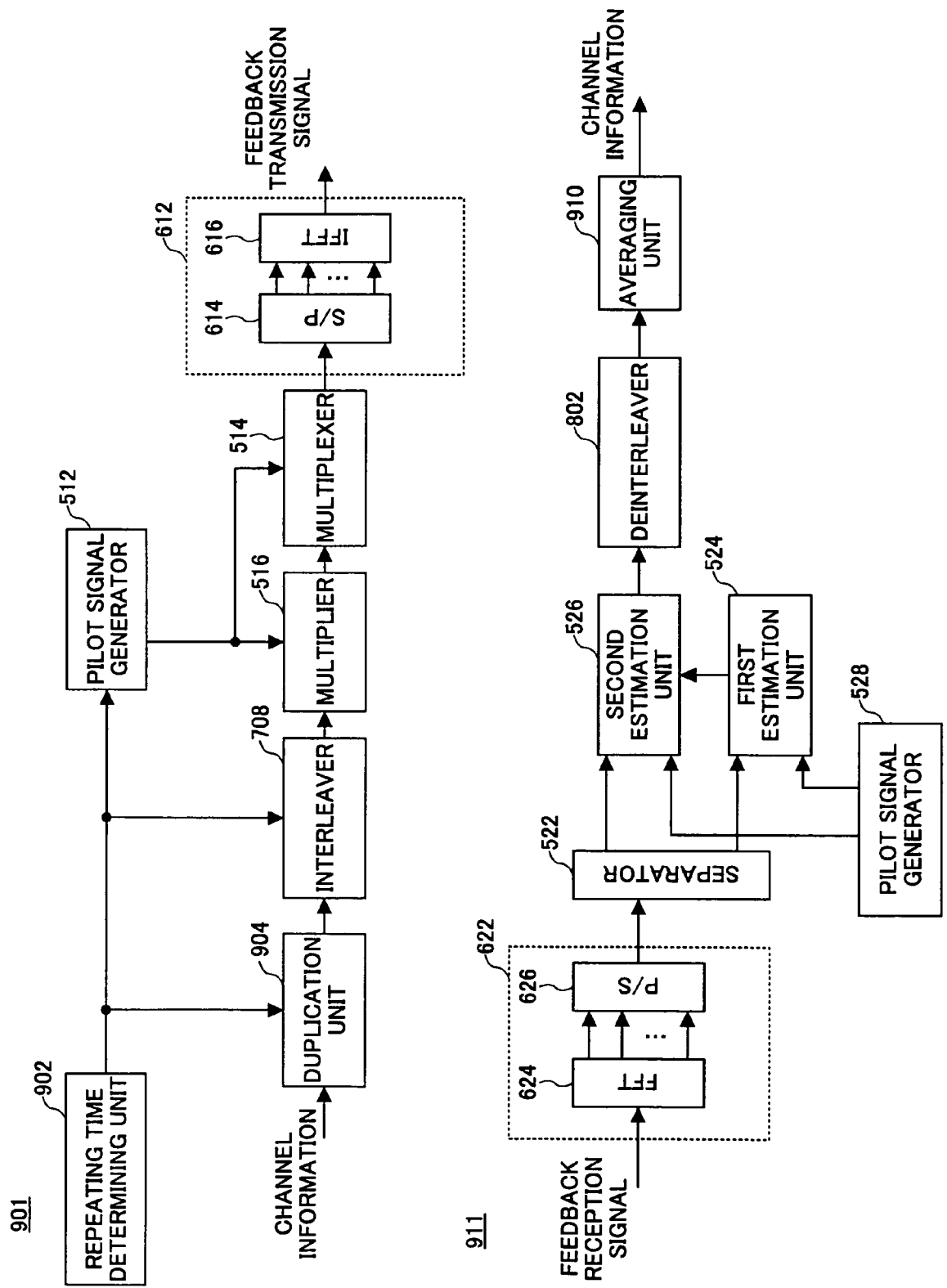
FIG. 9 is a schematic view of a wireless communication system in accordance with a fifth embodiment of the present invention.

FIG. 9 is a block diagram illustrating wireless communication devices 901 and 911 that are employed in a wireless communication system in accordance with a fifth embodiment of the present invention. The wireless communication device 901 transmits feedback signals, and the wireless communication device 911 receives the feedback signals.

The wireless communication device 901 includes a repeating time determining unit 902 and a duplication unit 904, as well as the above described pilot signal generator 512, the multiplier 516, the multiplexer 514, the OFDM modulator 612, and the interleaver 708. The wireless communication device 911 includes an averaging unit 910, as well as the above described OFDM demodulator 622, the separator 522, the first and second estimation units 524 and 526, the pilot signal generator 528, and the deinterleaver 802. The OFDM modulation and demodulation, and the channel estimation are described above, and therefore, further explanation of them is omitted herein.

The duplication unit 904 makes duplicates of each input signal in accordance with the number $N_d$ of repeating times determined by the repeating time determining unit 902. More specifically, the duplication unit 904, to which the channel information h is input, outputs a signal stream in which $N_d$ of signals represent the channel information h, for example. The information as to the number of repeating times is also supplied to the interleaver 708, the pilot signal generator 512, or the like. The channel information duplicated by the duplication unit 904 is multiplied by a pilot signal at the multiplier 516 after interleaving. The channel information is then multiplexed with the same pilot signal as the above or another pilot signal at the multiplexer 514. The multiplexed channel information is subjected to inverse fast Fourier transform at the OFDM modulator 612, and is then transmitted as a feedback signal.

The feedback signal received on the reception end is subjected to fast Fourier transform at the OFDM demodulator 622. Channel estimation is then carried out by the first and second estimation units 524 and 526. Deinterleaving is performed by the deinterleaver 802, and the deinterleaved signals are input to the averaging unit 910. The averaging unit 910 determines the average value of the same number of channel values as the number of duplications determined by the repeating time determining unit 902. Thus, more accurate channel information can be output.

In accordance with this embodiment, the channel information to be fed back as a feedback signal is repetitively transmitted. Accordingly, the reception energy per channel estimate value increases, and the feedback signals can be accurate.

Sixth Embodiment

Figure 10:
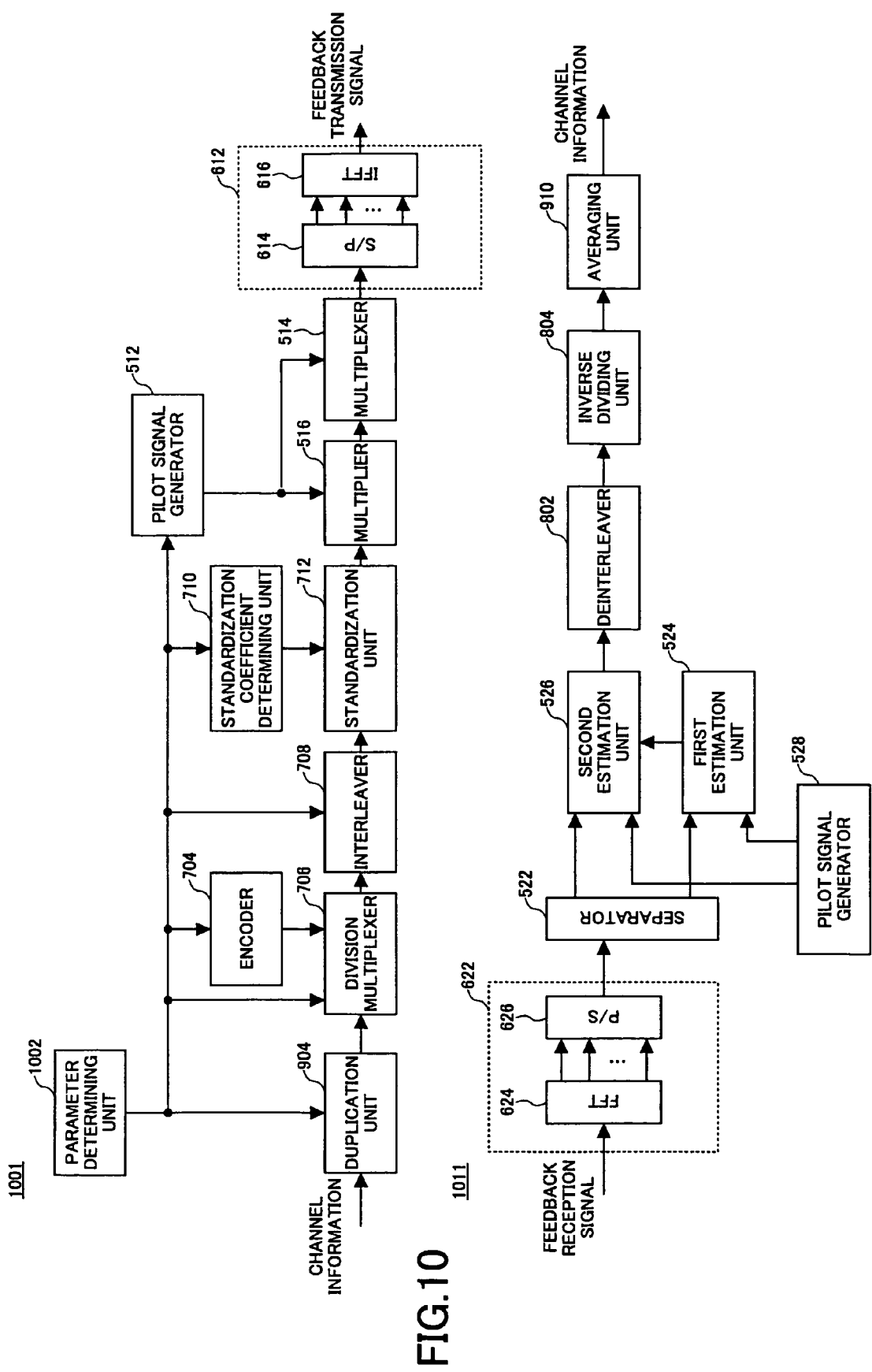
FIG. 10 is a schematic view of a wireless communication system in accordance with a sixth embodiment of the present invention.

FIG. 10 illustrates a wireless communication device 1001 and a wireless communication device 1011. The wireless communication device 1001 transmits a feedback signal after normalizing each signal representing channel information (Second Embodiment), performing code multiplexing (Fourth Embodiment), performing interleaving (Fourth embodiment), and making duplicates of the channel information (Fifth Embodiment). The wireless communication device 1011 receives the feedback signal and performs the signal processing that is reverse to the above. The parameter determining unit 1002 determines various parameters such as the length and the number of codes to be used. The parameter determining unit 1002 then sends those parameters to relevant components. With such a wireless communication device, the effects of each of the foregoing embodiments can be achieved. Thus, the accuracy of each feedback signal can be more precisely controlled. For example, the code length, the number of multiplexing times, and the number of repeating times are adjusted so as to flexibly increase or decrease the reception energy per channel estimate value.

Seventh Embodiment

In the Fourth Embodiment and Fifth Embodiment, channel information is detected through despreading. However, to obtain more accurate channel estimates in an ESDM wireless communication system, channel information may be estimated by the minimum mean square error (MMSE) method, instead of the simple despreading. In such a case, the channel information of the forward link can be determined by $w_1^H r_f / |w_1^H X_1|$, where, 1 is an index of a stream, $r_f$ represents a received feedback signal, and $w_1$ represents the amount that is determined by the following equation:

$$w_l = \left( \sum_{\forall l'} X_{l'} X_{l'}^H + \sigma I \right)^{-1} X_l$$

where σ represents the noise power, I represents the unit matrix, and $X_1$ represents the element that is the product HC of a channel matrix H and a matrix C consisting of spread codes.

The spread codes that are used for a channel estimate value $h_1$ to be fed back are set as:

$c_1 = [c_{11} c_{12} \ldots c_{1Ns}]$

When $h_1$ is spread by $c_1$, $N_s$ of transmission symbols are obtained, which symbols can be expressed as:

$[c_{11} c_{12} \ldots c_{1Ns}]^T \times h_1 s_1$ where $N_s$ represents the spread code length. As the value of the feedback channel to be transmitted together with $c_{10}$ is set as $h_0'$ reception signals $r_1$ corresponding to $h_1$ are expressed as:

$r_1 = [h_1' c_{11} h_2' c_{12} \ldots h_{Ns}' c_{1Ns}]^T \times h_1 s_1$

Accordingly, the reception signal r of a spread multiplexed signal is expressed as:

$r_1 = X_1 h_1 s_1 + X_2 h_2 s_2 + \ldots + X_L h_L s_L$ where, $X_1 = [h_1' c_{11} h_2' c_{12} \ldots h_{Ns}' c_{1Ns}]^T$ where L represents the number of spread codes.

When the number of duplicates to be made in the Fifth Embodiment is set as $N_d$, the channel information $h_1$ is transmitted through $N_d$ of channels. X1 are set as $[h_1' h_2' \ldots h_{Nd}']^T$, and the same operation as above can be performed.

Further, in the case where the coding division of the Fourth Embodiment and the duplication of the Fifth Embodiment are combined, one channel estimate value is transmitted through $N_d \times N_s$ of channels. The reception signals $r_1$ corresponding to $h_1$ are expressed as:

$r_1 = [h_1 c_{11} h_2 c_{12} \ldots h_{Ns} c_{1Ns} h_{(Ns+1)} c_{11} h_{(Ns+2)} c_{12} \ldots h_{(Ns+Ns)} c_{1Ns} \ldots h_{(Nd \times Ns)} c_{NS}]^T \times h_1 s_1$ When $X_1$ is expressed as:

$X_1 = [h_1' c_{11} h_2' c_{12} \ldots h_{(Nd \times Ns)}' c_{1Ns}]^T$

Accordingly, the reception signal r of a divided multiplexed signal is expressed as:

$r = X_1 h_1 s_1 + X_2 h_2 s_2 + \ldots + X_L h_L s_L$

Eighth Embodiment

The normalization performed in the Third Embodiment is convenient, as the signal processing can be performed at a suitable amplitude level. Then, the absolute reception level $P_n$ of each sub carrier cannot be recognized. Instead, only the relative reception level $P_n'$ of each sub carrier can be recognized. Accordingly, it is not easy to realize accurate signal quality, based on feedback signals. In this embodiment, the feedback signals described in the foregoing embodiments contain a signal representing the absolute reception level. Alternatively, the signal representing the absolute reception level is transmitted separately from the feedback signals. In any way, the signal representing the absolute reception level is transmitted to the reception end. The signal representing the absolute reception level may be anything, as long as it can show the reference power, such as the average power over all the sub carriers, or the signal power relating to a particular sub carrier. The wireless communication device that acquires the absolute reception level together with a feedback signal can recognize the absolute signal power $P_n$ relating to each sub carrier. For example, in a case where the absolute reception level $P_1$ of the sub carrier 1 is obtained from the feedback signal, using $P_n'$ which is the reception level of a sub carrier n, the absolute reception level $P_n$ relating to the sub carrier n is expressed as $P_n = P_n' \times P_1' / P_1$. As the absolute reception level is known, the signal quality such as a SNR can be calculated based on the absolute reception level. In accordance with the SNR or the like, a suitable modulation method and spreading method can be employed.

It should be noted that the present invention is not limited to the embodiments specifically disclosed above, but other variations and modifications may be made without departing from the scope of the present invention.

This patent application is based on Japanese Priority Patent-Application No. 2004-144179, filed on May 13, 2004, the entire contents of which are hereby incorporated by reference.

What is claimed is:

1. A wireless communication system that transmits a forward link feedback signal containing at least a backward link channel estimate value between a first wireless communication device and a second wireless communication device, the wireless communication system including
    the first wireless communication device that transmits the forward link feedback signal, comprising:
        a channel estimation unit that receives a signal containing a pilot signal, and determines a forward link channel estimate value of a wireless link;
        a multiplier that multiplies a first pilot signal by the forward link channel estimate value; and
        a multiplexer that multiplexes an output signal from the multiplier with a second pilot signal, to generate the forward link feedback signal; and
    the second wireless communication device that receives the forward link feedback signal, comprising:
        a separator that separates the signals that are multiplexed in the forward link feedback signal; and
        a channel estimation unit that determines the forward link channel estimate value of the wireless link, based on the first and second pilot signals, said channel estimation unit determining the backward link channel estimate value based on a first separated signal in the separated signals and the second pilot signal, and determining the forward link channel estimate value based on a second separated signal in the separated signals, the first pilot signal, and the determined backward link channel estimate value.

2. A wireless reception device, comprising:
    a receiving unit that receives a forward link feedback signal in which a signal formed by multiplying a forward link channel estimate value of a forward link by a first pilot signal is multiplexed with a second pilot signal;
    a separator that separates the signals multiplexed in the forward link feedback signal; and
    a channel estimation unit that determines the channel estimate value of the forward link, based on the first and second pilot signals, said channel estimation unit determining the backward link channel estimate value based on a first separated signal in the separated signals and the second pilot signal, and determining the forward link channel estimate value based on a second separated signal in the separated signals, the first pilot signal, and the determined backward link channel estimate value.

3. The wireless reception device as claimed in claim 2, wherein the channel estimation unit comprises:
   a backward channel estimation unit that determines a channel estimate value of a backward link, based on one of the signals separated by the separator; and
   a forward channel estimation unit that determines the channel estimate value of the forward link, based on the other one of the signals separated by the separator and the channel estimate value of the backward link.

4. The wireless reception device as claimed in claim 2, further comprising:
   a demodulating unit that demodulates the signal, which is received by the receiving unit, by the orthogonal frequency division multiplexing (OFDM) method.

5. The wireless reception device as claimed in claim 2, further comprising:
   a code despreading unit that code-despreads each signal containing the forward link channel estimate value of the forward link.

6. The wireless reception device as claimed in claim 2, further comprising:
   a deinterleaver that rearranges signals containing the forward link channel estimate value of the forward link in a predetermined order.

7. The wireless reception device as claimed in claim 2, further comprising:
   a MMSE filter that determines the forward link channel estimate value of the forward link based on a channel estimate value of a backward link by the minimum mean square error (MMSE) method.

8. A channel estimation method, comprising
   receiving with a receiver a forward link feedback signal in which a first pilot signal is multiplexed with a signal formed by multiplying a forward link channel estimate value of a forward link by a second pilot signal;
   separating the signals multiplexed in the feedback signal into a first separated signal containing the first pilot signal and a second separated signal containing the second pilot signal multiplied by the forward link channel estimate;
   determining a backward link channel estimate value based on the first pilot signal and the first separated signal; and
   determining the forward link channel estimate value of the forward link, based on the second pilot signal, the second separated signal, and the determined backward link channel estimate value.

\* \* \* \* \*